Patented Sept. 29, 1942

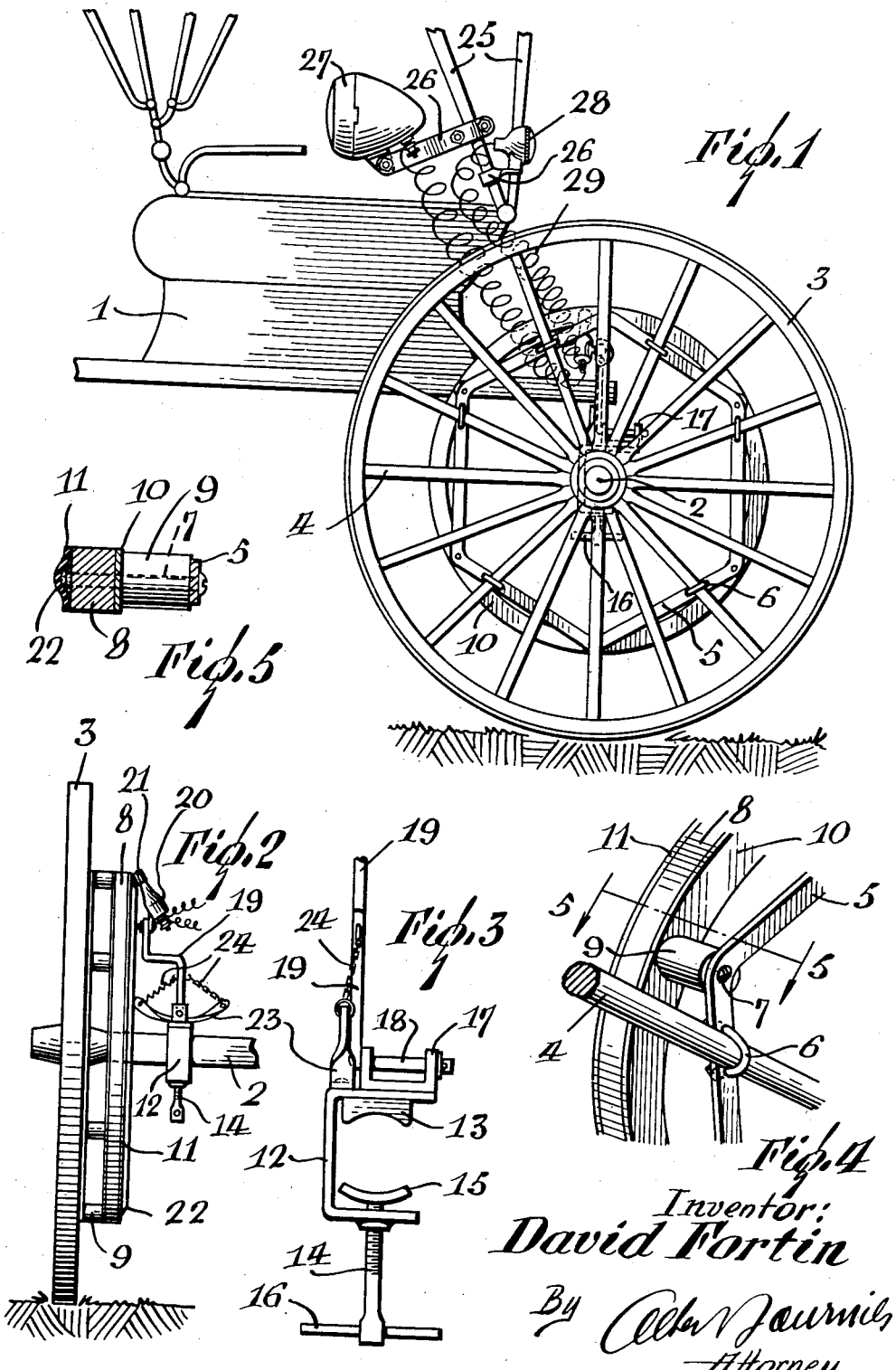

2,296,914

UNITED STATES PATENT OFFICE 2,296,914

CURRENT GENERATING DEVICE FOR VEHICLES

David Fortin, Lac Ste.-Croix, Quebec, Canada

Application February 26, 1942, Serial No. 432,483
In Canada February 4, 1942

3 Claims. (Cl. 171—313)

The present invention pertains to a novel device designed especially for attachment to a horse drawn vehicle for the purpose of generating electric current for lamps carried by such vehicle.

In rural districts where horse drawn vehicles are still numerous, there are many collisions between these vehicles and automobiles at night. Frequently the horse drawn vehicles carry oil lamps, and in some states are required by law to do so, but these lamps are frequently of insufficient intensity to avoid accidents. In many cases the oil lamps are neglected entirely because of the inconvenience in keeping them in proper operating condition.

The object of the present invention is to provide a convenient and inexpensive device for furnishing electric current, whereby the horse drawn vehicles may carry automobile headlights, the forwardly directed lights being suitable for road illumination as well as mere signaling. A generator is supported by the axle and driven by an attachment to one of the vehicle wheels. This attachment is in the form of a supplemental ring having a friction surface engaging a rotatable element of the generator. Also, the generator is supported in a resilient manner by means of a novel clamp applied to an axle, so that the jolts and vibrations of the wheel are not transmitted entirely to the generator.

The invention is fully disclosed by way of example in the following description and in the accompanying drawing in which:

Figure 1 is a side elevation of a wagon equipped according to the invention;

Figure 2 is a detail end view showing the power-generating wheel;

Figure 3 is a vertical elevation at right angles to Figure 2;

Figure 4 is a detail perspective view, and

Figure 5 is the section on the line 5—5 of Figure 4;

Reference to these views will now be made by use of like characters which are employed to designate corresponding parts throughout.

In Figure 1 is shown a buggy or wagon 1 of usual construction, having a rear axle 2 on which are mounted wheels in the usual manner, one of these wheels being designated by the numeral 3.

To the spokes 4 of the wheel 3 is fastened an octagonal frame member 5, preferably of metal, by means of suitable clips or clevises 6. Bolts 7 are passed through the member 5 at suitable points, in a direction parallel to the axle 2, for the purpose of supporting a circular ring 8 in a plane parallel to that of the rear wheel 3, as shown more clearly in Figure 2. Tubular spacers 9 are mounted on the bolts to maintain a proper distance between the wheel and the ring.

The ring consists preferably of wood and is fitted with a metal lining ring 10. On the outer circumference of the ring is fitted a cover 11 of leather, rubber or other suitable friction material for a purpose that will presently be described.

On the axle 2 is mounted a clamp including a frame 12 having an upper concave jaw 13 adapted to rest upon the axle. Opposite this jaw, a screw 14 is threaded in the frame 12 and carries a complementary jaw 15 adapted to be tightened against the axle by means of a handle 16 on the screw. A bracket or journal 17 is fixed upon the frame 12 and pivotally supports the horizontal lower end 18 of a suitably bent and upwardly extending arm 19 which terminates adjacent to the ring 8. To the upper end of the arm is secured a dynamo or generator 20 of a design now on the market and fitted with a pinion or knurled nut 21 carried by its shaft. The generator 20 is inclined to bring the member 21 into engagement with the beveled surface 22 of the friction member 11, whereby the generator is driven.

A bracket 23 is fixed on the frame 12, lying lengthwise of the axle, and has its ends connected by springs 24 to an adjacent portion of the arm 19. It will be noted that the end portion 18 is transverse of the axle and the brackets 23. Consequently, the post 19, being pivotally mounted in the journal 17, is resiliently mounted with respect to the wheel 3 and ring 8, whereby the generator is protected from jolts of the wheel.

One or more frame members 25 of the vehicle 1 carry clips or brackets 26 to which are secured a headlight 27 facing forwardly and a tail light 28 facing rearwardly. These are suitably wired to the terminals of the generator 20 by conductors 29.

It will now be seen that the invention provides a simple and effective means whereby a horse drawn vehicle may generate electric current for the illuminaiton of lights carried by the vehicle in keeping with the objects of the invention as set forth above.

Although a specific embodiment of the invention has been illustrated and described, it will be understood that various alterations in the details of construction may be made without departing from the scope of the invention as indicated by the appended claims.

What I claim is:

1. A device of the character described comprising a ring adapted for attachment to a wheel of a vehicle in parallel relation thereto, a clamp adapted for attachment to an axle of the vehicle, and arm extending from said clamp towards said ring, and a generator carried by said arm and in driving relation with said ring.

2. A device of the character described comprising a ring adapted for attachment to a wheel of a vehicle in parallel relation thereto, a clamp adapted for attachment to an axle of the vehicle, an arm pivotally supported by said clamp, a bracket mounted on said clamp and extending transversely of the journaled portion of said arm, springs extending from the ends of said bracket to said arms, and a generator carried by said arm and in driving relation with said ring.

3. A device of the character described comprising a ring adapted for attachment to a wheel of a vehicle in parallel relation thereto, a clamp adapted for attachment to an axle of the vehicle, an arm pivotally supported by said clamp, a bracket mounted on said clamp and extending transversely of the journaled portion of said arm, springs extending from the ends of said bracket to said arms, a circular frictional member mounted on said ring, and a generator supported by said arm adjacent to said member, said generator having a rotatable element engaging said member.

DAVID FORTIN.